(12) United States Patent
Huo et al.

(10) Patent No.: US 8,588,148 B2
(45) Date of Patent: Nov. 19, 2013

(54) SYSTEM AND METHOD FOR SELECTING CHANNELS IN WIRELESS COMMUNICATION

(75) Inventors: Changqin Huo, Calgary (CA); Dorin Viorel, Calgary (CA); Aram Sukiasyan, Calgary (CA)

(73) Assignee: Fujitsu Semiconductor Limited, Yokohama-shi (JP)

( * ) Notice: Subject to any disclaimer, the term of this patent is extended or adjusted under 35 U.S.C. 154(b) by 637 days.

(21) Appl. No.: 12/483,336

(22) Filed: Jun. 12, 2009

(65) Prior Publication Data

US 2009/0310555 A1 Dec. 17, 2009

Related U.S. Application Data

(60) Provisional application No. 61/061,410, filed on Jun. 13, 2008.

(51) Int. Cl.
*H04W 4/00* (2009.01)

(52) U.S. Cl.
USPC .......................................................... 370/329

(58) Field of Classification Search
USPC ........................................ 370/329, 322, 332
See application file for complete search history.

(56) References Cited

U.S. PATENT DOCUMENTS

| | | | | |
|---|---|---|---|---|
| 5,819,168 A | * | 10/1998 | Golden et al. | 455/303 |
| 5,898,928 A | * | 4/1999 | Karlsson et al. | 455/450 |
| 7,990,949 B2 | * | 8/2011 | Karaoguz et al. | 370/352 |
| 2007/0087772 A1 | * | 4/2007 | Yi et al. | 455/522 |
| 2009/0131066 A1 | * | 5/2009 | Barve et al. | 455/452.2 |

OTHER PUBLICATIONS

IEEE Standard for Local and Metropolitan Area Networks, Part 16: Air Interface for Fixed Broadband Wireless Access Systems, IEEE Std. 802.16™-2004 (Revision of IEEE Std. 802.16-2001, Oct. 1, 2004 (895 total pages).

* cited by examiner

*Primary Examiner* — Mark Rinehart
*Assistant Examiner* — Mohammad Anwar
(74) *Attorney, Agent, or Firm* — Baker Botts L.L.P.

(57) ABSTRACT

According to one embodiment, a method for wireless communication includes coupling a base station to a network access device. The network access device provides access to an Internet service provider network. The method also includes determining, at the base station, a plurality of available communication channels of a wireless service provider network that may be utilized to communicate with an endpoint. In addition, the method includes determining, at the base station, at least one interference power measurement for at least one channel of the plurality of channels. Further, the method includes determining, at the base station, at least one average interference power for at least one channel of the plurality of channels utilizing the at least one interference power measurement. The method also includes automatically selecting a channel for communication with the endpoint in response to determining the at least one average interference power. Moreover, the method includes providing the endpoint access to the wireless service provider network utilizing the Internet service provider network via the selected channel.

18 Claims, 4 Drawing Sheets

SYSTEM AND METHOD FOR SELECTING CHANNELS IN WIRELESS COMMUNICATION

RELATED APPLICATION

This application claims benefit under 35 U.S.C. §119(e) of U.S. Provisional Application Ser. No. 61/061,410, entitled "RFIC BASED SCHEME FOR PARAMETER AUTO-CONFIGURATION," filed Jun. 13, 2008, by Changqin Huo et al.

TECHNICAL FIELD

This invention relates generally to wireless communication and more particularly to a system and method for selecting channels in wireless communication.

BACKGROUND

Wireless communication systems have suffered from problems of interference. Establishing communication channels that remain resilient in their quality of service has been problematic and complicated. Technically experienced operators have been needed to adjust and/or calibrate a wireless communication device, such as a wireless base station, in order to establish adequately-performing communication sessions. This is both time consuming and expensive. A previous solution involves using a centralized controller to choose the wireless channels for the devices communicating on the wireless network. This suffers from a lack of robustness and is inefficient.

SUMMARY

According to one embodiment, a method for wireless communication includes coupling a base station to a network access device. The network access device provides access to an Internet service provider network. The method also includes determining, at the base station, a plurality of available communication channels of a wireless service provider network that may be utilized to communicate with an endpoint. In addition, the method includes determining, at the base station, at least one interference power measurement for at least one channel of the plurality of channels. Further, the method includes determining, at the base station, at least one average interference power for at least one channel of the plurality of channels utilizing the at least one interference power measurement. The method also includes automatically selecting a channel for communication with the endpoint in response to determining the at least one average interference power. Moreover, the method includes providing the endpoint access to the wireless service provider network utilizing the Internet service provider network via the selected channel.

In some embodiments, the at least one interference power measurement may be determined by a radio frequency integrated circuit. The at least one interference power measurement may be a measurement taken during a preamble phase of a communication frame of the wireless service provider network.

According to one embodiment, a system for wireless communication includes an interface coupled to a network access device. The network access device provides access to an Internet service provider network. The system also includes a processor operable to determine a plurality of available communication channels of a wireless service provider network that may be utilized to communicate with an endpoint. The processor is also operable to determine at least one interference power measurement for at least one channel of the plurality of channels. Further, the processor is operable to determine, at the base station, at least one average interference power for at least one channel of the plurality of channels utilizing the at least one interference power measurement. In addition, the processor is operable to automatically select a channel for communication with the endpoint in response to determining the at least one average interference power. The system also includes a radio that is operable to communicate with an endpoint utilizing the selected channel such that the endpoint is provided access to the wireless service provider network utilizing the first communication network.

Depending on the specific features implemented, particular embodiments may exhibit some, none, or all of the following technical advantages. By automatically selecting a channel for communication, the amount of time an operator needs to spend configuring a base station may be reduced. Also, measuring the level of interference during phases such as the preamble phase may lead to more accurate representations of the quality of the channel. Other technical advantages will be readily apparent to one skilled in the art from the following figures, description and claims.

BRIEF DESCRIPTION OF THE DRAWINGS

Reference is now made to the following description taken in conjunction with the accompanying drawings, wherein like reference numbers represent like parts and which.

DETAILED DESCRIPTION

Figure 1:
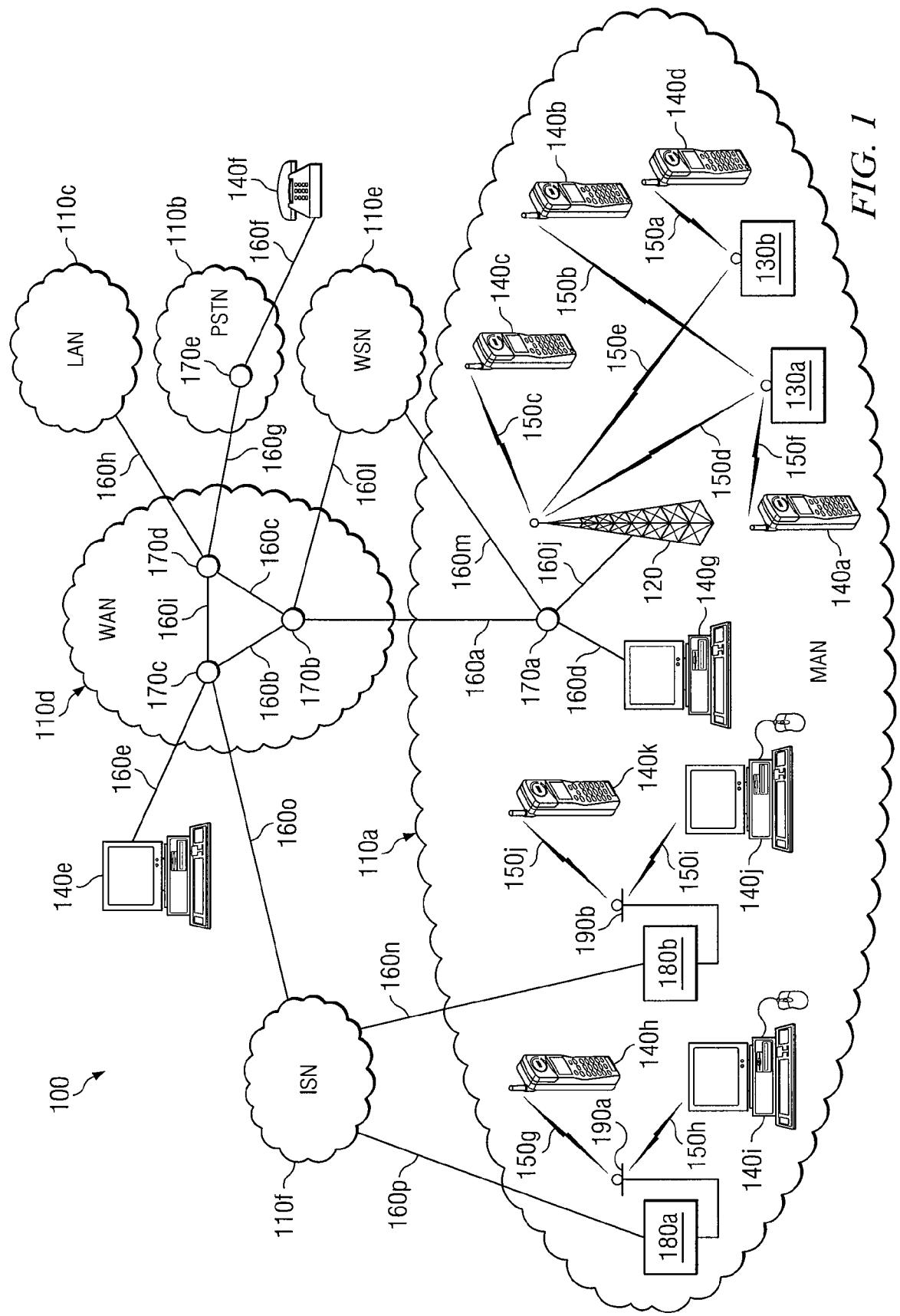
FIG. 1 illustrates a communication system comprising various communication networks, in accordance with a particular embodiment.

FIG. 1 illustrates a communication system comprising various communication networks, in accordance with a particular embodiment. Communication system 100 may be comprised of multiple networks 110. Each network 110 may be any of a variety of communication networks comprising any of a variety of communication protocols designed to support one or more different services either independently or in conjunction with other networks and/or communications protocols. For example, networks 110 may facilitate network and/or Internet access, via wired or wireless connections (e.g., a WiMAX service). The network access may allow for online gaming, file sharing, peer-to-peer file sharing (P2P), voice over Internet protocol (VoIP) calls, video over IP calls, or any other type of functionality typically provided by a network. In particular embodiments, one or more of networks 110 may comprise an IEEE 802.16 based wireless network, popularly known as WiMAX, which may include macro base stations (mBSs), such as mBS 120, relay stations (RSs), such as RSs 130, and femto base stations (fBSs), such as fBSs 190.

For simplicity and ease of discussion, the remainder of this description may use a simplified nomenclature for the various entities that may be involved. 'Owner' may refer to the entity that has purchased an fBS or to whom the fBS is registered. 'User' may refer to the entity to whom a wireless service is being provided. 'Internet service' may refer to the service that the owner uses to access external networks, such as the Internet. While the term 'Internet' is used, it is used for simplicity and is not intended to be limited to only the Internet but includes any type of network, including public and private networks, that the fBS may use to establish its backhaul connection. 'Internet service provider' (ISP) may refer to the entity that provides the Internet service for the owner. 'Wireless service' or 'carrier service' may refer to the service that the user uses for wireless access, such as WiMAX. 'Wireless service provider' (WSP) may refer to the entity that provides the wireless service for the user or owner. While this nomenclature is used for simplicity, it does not represent the entire scope of all possible embodiments. For example, an owner may also be a user and the ISP may also be the WSP. As another example, the ISP may not be directly providing the owner with Internet access (e.g., the ISP may provide a building with Internet access, the building owner may then provide the fBS owner with Internet access).

In the embodiment depicted in FIG. 1, network 110a includes fBSs 190. fBSs 190 may, in essence, be small base stations purchased (or leased) by the owner from the WSP. The owner is then responsible for installing the fBS, for example at his premise. Once installed the fBS provides a geographically small coverage area that may be used to enhance the signal coverage within the owner's premise. Depending on the scenario, the owner may share this coverage with other, unknown users (e.g., the fBS is a public fBS), or he may limit it to known/authorized users (e.g., the fBS is a private fBS).

In some situations, communication from one fBS 190 (such as fBS 190a) may be susceptible to interference caused by communication by another fBS 190 (such as fBS 190b). As described further below, fBSs 190 may be configured to analyze the network and determine one or more communication parameters to use that are not as susceptible to interference. For example, a wireless communication protocol may be implemented in which a channel is characterized by a center frequency. Communicating on the channel may include communicating on one or more subchannels which may include frequencies associated with the center frequency. The subchannels may be grouped into various segments which may be identified by a segment index. More than one base station (either an mBS or a fBS) may utilize the same channel. As part of the communication protocol, each of the base stations may be configured to utilize one of a predetermined set of preambles while communicating with nodes in the network. These preambles may be identified by preamble indices. Endpoints 140 may utilize the received preambles to receive another transmission from a base station that gives parameters for a communication frame. For example, endpoints 140 may utilize the preamble to receive and analyze one or more downlink maps (DL-MAP) which may contain identification information for the transmitting base station. After becoming operational at a premises, fBSs 190 may need to determine one or more of such parameters in order to communicate with nodes in their vicinity.

The fBS is envisioned as being installed at the owner premise by the owner with little or no support from the WSP. This is different than other types of small base station entities, which are typically installed and commissioned by the WSP. Since fBSs are operated in a home or office environment, it may be natural to consider fBSs 190 as private equipment accessible only by the owners' endpoints 140. However, in certain situations the owner of an fBS may provide wireless service to endpoints 140 of non-owners. Such fBSs may be referred to as public accessible fBSs.

Because the owner may purchase the fBS from a WSP and install it in their home, or virtually at any location with a broadband connection, the WSP may have little or no control over the location of fBSs 190. Accordingly, the WSP may attempt to determine the location of fBS 190 as part of an fBS initialization and operation procedure. There may be at least two considerations that a WSP may have with respect to the location of the fBS:

1.) The fBS may only be authorized to operate in a geographic area where the WSP has a license to use the RF spectrum. Accordingly, the operator may need to know the location of the fBS with an accuracy of 10 kilometers to meet the spectrum license related location requirement.

2.) The WSP may need to know the position of an fBS, within 100 meters, in order to provide location-based services (e.g., E911) and to optimize the wireless operation of its wireless networks through radio resource management (e.g., assigning proper carrier/segment/subchannels and fBS transmission power based on interference coming from the other fBSs in the same neighborhood) to ensure quality of service levels.

Fixed-mobile convergence (FMC) is the scenario where users can enjoy service continuity and service integration when they roam between outdoor and indoor environments. fBSs 190 may facilitate FMC by allowing endpoints 140 to use a single wireless interface. More specifically, once fBS 190b, for example, is installed in the owner's home he is able to use the same mobile device with the same wireless interface to connect to either mBS 120 outside or fBS 190b inside. The selection of which device to connect to can be made manually by the user or autonomously by endpoint 140k, BS 120, or any component coupled to or controlled by WSN network 110e. In some embodiments, certain endpoints 140 may be able to transition between an mBS 120 and an fBS 190 (a "handover") in a manner that does not interrupt an active communication session occurring at endpoints 140. Handover may occur with assistance from nodes within network 110e. For example, such nodes may transmit identifiers for an mBS 120 that an fBS 190 should use for handing over an endpoint 140. Further details of this process, in accordance with various embodiments, are described below.

Part of the installation process for the fBS may include providing it with Internet access for its backhaul connection. In the scenario depicted in FIG. 1, fBSs 190 are connected to network access devices 180. This connection may provide fBSs 190 with their backhaul connection to the WSP's network, WSN network 110e. Network access device 180 may provide the owner with general Internet access. fBSs 190 do not use dedicated back-haul communication lines associated with the WSP, but rather use the owner's existing Internet access. Depending on the embodiment and scenario the ISP and the WSP may be the same entity.

While fBSs 190 may use the owner's existing Internet access, similar to a traditional (e.g., WiFi) local area network wireless access point, as a user leaves the fBS's coverage area they may be handed-off to RS 130 or mBS 120. The hand-off may be possible because the user's endpoint is able to use the same wireless interface with RS 130 or mBS 120 that it uses with fBS 190. Furthermore, unlike a traditional WiFi wireless access point, operated in a license-exempt band, the fBS may typically be operated in a licensed band.

Within a network using a wireless protocol (e.g., 802.16j, or 802.16m), such as network 110a, particular embodiments may allow for fBSs 190 to be public or private. A public fBS may allow any of endpoints 140 to connect thereto; a private fBS may only allow connections from those endpoints 140 who are authorized to connect thereto. For example, fBS 190a may be a private fBS that the owner has installed in his home. The owner of fBS 190a may have authorized endpoints 140h and 140i (which may, for example be his phone (e.g., a mobile phone) and his laptop computer) to connect to fBS 190a, Accordingly, only these two endpoints may connect to fBS 190a, On the other hand, fBS 190b may be a public fBS, installed at a business. Accordingly, any of endpoints 140 within the coverage area of fBS 190b may connect thereto.

Each of endpoints 140 is connected to one of mBS 120, RSs 130, or fBSs 190. For simplicity, the component to which an endpoint is connected may be referred to as an access station. For example, the access station for endpoint 140e is fBS 190a, Between each endpoint 140 and its respective access station there may be a wireless connection 150, sometimes referred to as an access link. These wireless connections may be referred to as access links because they provide the endpoint with access to a network. Similarly, between each RS and mBS (or between two RSs) there may be a wireless connection 150, sometimes referred to as a relay link. This wireless connection may be referred to as a relay link because it relays communications between the access links and the mBS.

A wireless connection may comprise various wireless resources such as, for example, a combination of a particular center frequency, a particular bandwidth, a particular time slot, and/or a particular subchannel or group of subchannels (for example, as described in a downlink or uplink map). In particular embodiments, it may be convenient to discuss the resources used by a link in terms of slots. Depending on the embodiment, a slot may comprise a particular number of subchannels and symbols (also known as time slots). For example, Section 8.4.3.1 of the Institute of Electrical & Electronics Engineers (IEEE) 802.16e-2005 Standard specifies a slot comprising a single subchannel and two symbols.

An increase in the number of wireless connections 150 within a given area may increase the impact and severity of interference between wireless connections 150. This may cause a decrease in quality of service (QoS) and an increase in maintenance costs. This may be of particular concern with respect to a large rollout of fBSs 190. More specifically, because the owner installs the fBS, there is no way for the WSP to perform any prior frequency planning and/or site surveillance. Accordingly, it may be desirable to know where a particular fBS has been configured. In particular embodiments, uplink sounding may be used to estimate the channel gain and interference strength between mBS 150, and multiple RSs 130 and fBSs 190. The uplink sounding may, therefore, be used in determining the quality and/or efficiency of the various wireless connections. This information may be used to facilitate in allowing the fBS to operate with little or no local intervention.

Although the example communication system 100 of FIG. 1 includes six different networks, networks 110a-110f, the term "network" should be interpreted as generally defining any network or combination of networks capable of transmitting signals, data, and/or messages, including signals, data or messages transmitted through WebPages, e-mail, text chat, voice over IP (VoIP), and instant messaging. Depending on the scope, size and/or configuration of the network, any one of networks 110a-110f may be implemented as a LAN, WAN, MAN, PSTN, WiMAX network, global distributed network such as the Internet, Intranet, Extranet, or any other form of wireless or wired network.

Networks 110 may include any number and combination of wired links 160, wireless connections 150, nodes 170 and/or endpoints 140. For purposes of illustration, and only by way of example, network 110a is a MAN that may be implemented, at least in part, via WiMAX; network 110b is a PSTN (e.g., a voice based network); network 110c is a LAN; network 110d is a WAN (e.g., a long range optical network or the Internet); network 110e is a wireless service network (WSN) which may be operated by the WSP responsible for providing network 110a with wireless service (e.g., WiMAX); and network 110f is an Internet service network (ISN) which may be operated by the ISP responsible for providing its users with Internet access. Though not depicted in FIG. 1, both WSN network 110e and ISN network 110f may include servers, modems, gateways and any other components that may be needed to provide their respective service.

While networks 110 have been depicted as six separate networks, depending on the scenario any two, or more, of the networks may be a single network. For example, the WSP and the ISP may be the same business entity which may maintain the necessary components for both services on the same network thus merging ISN network 110f and WSN network 110e into a single network. Furthermore, the interconnections between networks 110 may vary from those depicted in FIG. 1. For example, if an owner uses Digital Subscriber Line (DSL) for his internet access, his fBS may connect through PSTN 110b.

Generally, networks 110a, and 110c-110f provide for the communication of packets, cells, frames, or other portions of information (generally referred to as packets herein) between endpoints 140 and/or nodes 170 (described below). In particular embodiments, networks 110a, and 110c-110f may be IP networks. IP networks transmit data by placing the data in packets and sending each packet individually to the selected destination, along one or more communication paths. Network 110b may, for example, be a PSTN that may include switching stations, central offices, mobile telephone switching offices, pager switching offices, remote terminals, and other related telecommunications equipment that are located throughout the world. Network 110d may be coupled to network 110b through a gateway. Depending on the embodiment, the gateway may be a part of network 110b and/or 110d (e.g., nodes 170e and/or 170c may comprise a gateway). The gateway may allow PSTN 110b to be able to communicate with non-PSTN networks such as any one of networks 110a or 110c-110f.

Any of networks 110a or 110c-110f may be coupled to other IP networks including, but not limited to, the Internet. Because IP networks share a common method of transmitting data, signals may be transmitted between devices located on different, but interconnected, IP networks. In addition to being coupled to other IP networks, any of networks 110a or 110c-110f may also be coupled to non-IP networks through the use of interfaces or components such as gateways.

Networks 110 may be connected to each other and with other via a plurality of wired links 160, wireless connections 150, and nodes 170. Not only do the wired links 160, wireless connections 150, and nodes 170 connect various networks but they also interconnect endpoints 140 with one another and with any other components coupled to or a part of any of networks 110. The interconnection of networks 110 may enable endpoints 140 to communicate data and control signaling between each other as well as allowing any intermediary components or devices to communicate data and control signals. Accordingly, users of endpoints 140 may be able to send and receive data and control signals between and among each network component coupled to one or more of networks 110.

As noted above, wireless connections 150 may represent wireless links between two components using, for example, WiMAX. The extended range of a WiMAX mBS, along with one or more RSs and fBSs, in certain cases, may allow network 110a to cover the larger geographic area associated with a MAN while using a relatively small number of wired links. More specifically, by properly arranging mBS 120, multiple RSs 130 and fBSs 190 around a metropolitan area, the multiple access stations may use wireless connections 150 or existing wired links to communicate with mBS 120, and wireless connection 150 to communicate with wireless endpoints 140 throughout the metropolitan area. mBS 120 may, through wired connection 160a, communicate with other mBSs, any components of network 110e, any network components not capable of establishing a wireless connection, and/or other networks outside of the MAN, such as network 110d or the Internet.

As mentioned above, the coverage quality of network 110a may be enhanced through the use of fBSs 190. More specifically, the relatively reduced range of a WiMAX fBS may allow network 110a to provide improved signal quality and/or capacity to users within smaller areas, for example within a building. fBSs 190 may be able to provide their access links through the use of existing network access. More specifically, fBSs 190 may connect to the owner's network access device 180. Once connected, fBS 190 may use the owner's Internet access, provided by the owner's ISP via the ISP's network (e.g., network 110f), for its backhaul connection to the WSP's network (e.g., network 110e).

Nodes 170 may include any combination of network components, modems, session border controllers, gatekeepers, ISN gateways, WSN gateways, security gateways, operation administration maintenance and provisioning (OAM&P) servers, network access provider (NAP) servers, base stations, conference bridges, routers, hubs, switches, gateways, endpoints, or any other hardware, software, or embedded logic implementing any number of communication protocols that allow for the exchange of packets in communication system 100. For example, node 170a may comprise another mBS that is wired to mBS 120 via link 160j and to network 110d via link 160a, As a mBS, node 170a may be able to establish several wireless connections of its own with various other mBSs, RSs, and/or endpoints. As another example, node 170e may comprise a gateway. As a gateway node 170e may allow network 110b, a PSTN network, to be able to transmit and receive communications from other non-PSTN networks, such as network 110d, an IP network. More specifically, as a gateway, node 170e may translate communications between the various protocols used by networks 110b and 110d.

Network access devices 180 may provide Internet access to fBSs 190 through any combination of hardware, software embedded in a computer readable medium, and/or encoded logic incorporated in hardware or otherwise stored (e.g., firmware). In particular embodiments, network access device 180 may be supplied by the owner's ISP. For example, if the owner's ISP is a cable company then the ISP may supply a cable modem as the network access device 180. As another example, if the owner's ISP is a phone company then the ISP may supply an xDSL modem as the network access device 180. As may be apparent, network access device 180 may provide Internet access to components other than fBSs 190. For example, the owner may connect his personal computer to network access device 180 to access the Internet.

Endpoints 140 and/or nodes 170 may provide data or network services to a user through any combination of hardware, software embedded in a computer readable medium, and/or encoded logic incorporated in hardware or otherwise stored (e.g., firmware). For example, endpoints 140a-140k may include a cell phone, an IP telephone, a computer, a video monitor, a camera, a personal data assistant or any other hardware, software and/or encoded logic that supports the communication of packets (or frames) using one or more of networks 110. Endpoints 140 may also include unattended or automated systems, gateways, other intermediate components or other devices that can send or receive data and/or signals.

Although FIG. 1 illustrates a particular number and configuration of endpoints, connections, links, and nodes, communication system 100 contemplates any number or arrangement of such components for communicating data. In addition, elements of communication system 100 may include components centrally located (local) with respect to one another or distributed throughout communication system 100.

Figure 2:
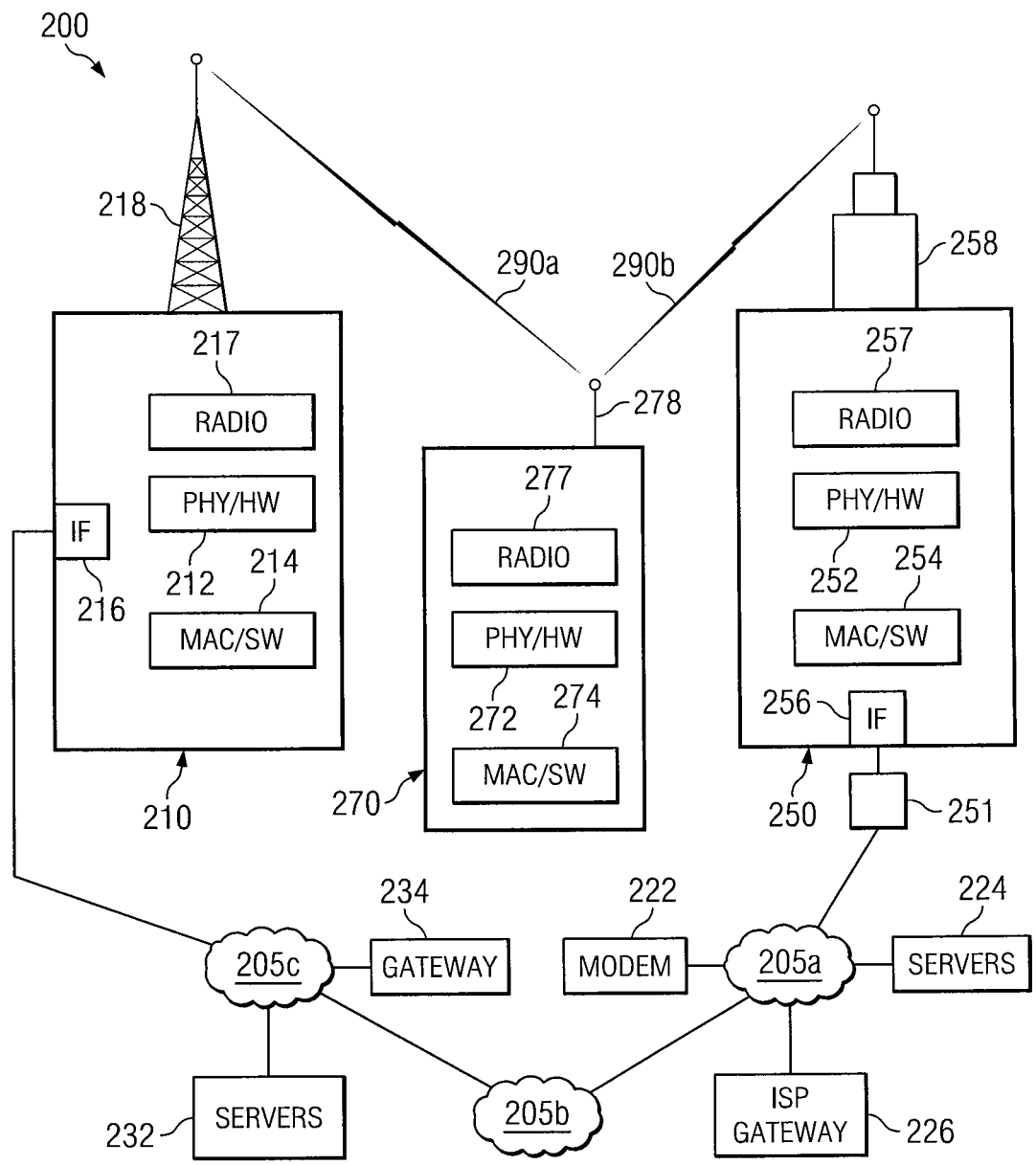
FIG. 2 illustrates one embodiment of a wireless network comprising an endpoint, a macro base station and a femto base station.

FIG. 2 illustrates a wireless network comprising a more detailed view of an endpoint, a mBS and a fBS, in accordance with a particular embodiment. More specifically, the depicted embodiment is a simplified scenario comprising networks 205, mBS 210, fBS 250 and endpoint 270. In different embodiments network 200 may comprise any number of wired or wireless networks, mBSs, endpoints, RSs, fBSs, and/or any other components that may facilitate or participate in the communication of data and/or signals whether via wired or wireless connections. mBS 210 and fBS 256 comprise PHY/HW blocks 212 and 252, MAC/SW blocks 214 and 254, communication interfaces 216 and 256, radios 217 and 257 and antennas 218 and 258. Similarly, endpoint 270 comprises PHY/HW block 272, MAC/SW block 274, radio 277, and antenna 278. These components may work together in order to provide wireless networking functionality, such as providing endpoints with wireless connections in a wireless network (e.g., a WiMAX wireless network). PHY/HW blocks 212, 252, and 272 comprise components and hardware operable to interact with a physical layer of a communication protocol. MAC/SW blocks 214, 254, and 274 comprise components and software operable to interact with a medium access control layer of a communication protocol. More details regarding aspects and components of FIG. 2 are provided below.

Networks 205 may comprise separate but interconnected networks operated by one or more different operators. More specifically, network 205a may be the ISP's network, network 205b may be a public network (e.g., the Internet), and network 205c may be the WSP's network. The owner of fBS 250 may use network 205a for Internet access. In providing the owner with network access, the ISP's network 205a may include modems 222, servers 224, and ISP gateway 226. Modems 222 may be used by the ISP to communicate with the owner's network access device 251. Thus, network access device 251 and modems 222 may have complimentary hardware and/or software that may enable them to communicate data between one another. Network access device 251 may act as the owner's access point, similar to network access device 180 discussed above with respect to FIG. 1. Modems 222 may act as a gateway between the ISP's network 205a and the owner's network access device 251. In particular embodiments, modems 222 may contain security gateway functionality. Servers 224 may comprise one or more servers such as OAM&P servers, Authentication, Authorization and Accounting (AAA) servers, Dynamic Host Configuration Protocol (DHCP) servers, or any other servers that the ISP may need to provide the owner with network access (or any other features provided by the ISP). ISP gateway 226 may comprise any hardware and/or software needed to couple network 205a with network 205b.

Network 205*c* may be a WiMAX service provider's network. Depending on the scenario, network 205*c* may be the user's or the owner's WiMAX service provider's network. In providing the WiMAX service, network 205*c* may utilize servers 232 and gateway 234. Servers 232 may comprise one or more servers such as OAM&P servers, Network Access Provider (NAP) servers, AAA servers, Self Organizing Network (SON) servers or any other servers that the WiMAX provider may need to configure/authenticate fBS 250 and provide users with WiMAX service. Gateway 234 may comprise any hardware and/or software needed to couple network 205*c* with network 205*b*.

Networks 205*a* and 205*c* may be coupled via network 205*b*. In some embodiments, network 205*b* may be the Internet. Thus, in such embodiments, fBS 250 may connect to the WSP's network, network 205*c*, via the Internet. Though network 205*b* is depicted as a single network, it may comprise any number of the networks described above with respect to FIG. 1. For example, network 205*b* may comprise the Internet, a LAN, WAN, MAN, PSTN or some combination of the above.

PHY/HW blocks 212, 252 and 272 may include any hardware needed for the operation of mBS 210, fBS 250, and endpoint 270, respectively. For example, PHY/HW blocks 212, 252 and 272 may each comprise one or more processors as well as analog-to-digital converters. Each processor may be a microprocessor, controller, application specific integrated circuit (ASIC), field programmable gate array (FPGA), or any other suitable computing device, resource, or combination of hardware, software and/or encoded logic operable to provide, either alone or in conjunction with other components, (e.g., memory) wireless networking functionality. Such functionality may include providing various wireless features discussed herein. For example, one or more of the processors within PHY/HW block 252 may be able to provide configuration parameters for fBS 250 (such as a communication channel).

In some embodiments, PHY/HW blocks 212, 252, and 272 may include one or more correlators. Correlators may be a discrete component or their functionality may be provided by using a combination of the hardware described above. The correlators may operate by comparing received signals to predetermined symbols and outputting a voltage based on the degree of similarity between the received signals and the predetermined symbols.

PHY/HW blocks 212, 252 and 272 may also each comprise memory modules. Each memory module may be any form of volatile or non-volatile memory including, without limitation, magnetic media, optical media, random access memory (RAM), read-only memory (ROM), flash memory, removable media, or any other suitable local or remote memory component or components. The memory modules may store any suitable data, instructions, logic or information utilized by mBS 210, fBS 250, and endpoint 270, respectively, including software embedded in a computer readable medium, and/or encoded logic incorporated in hardware or otherwise stored (e.g., firmware). For example, the memory modules may store information regarding channel characteristics of available communication channels for wireless connections 290. Such channel characteristics may include received signal strength indication (RSSI). Additional examples of information that may be stored by memory modules 214, 254, and 274 will be discussed below.

MAC/SW blocks 214, 254, and 274 may include any software, logic, or other information needed for the operation of mBS 210, fBS 250, and endpoint 270, respectively. In particular embodiments, the software, logic or other information may be stored within the memory modules of PHY/HW blocks 212, 252 and 272. For example, MAC/SW block 254 may comprise, stored within the respective memory modules, logic operable to analyze and select a channel for communication from a list of available channels for communication for wireless connections 290, as discussed in more detail below.

Radios 217, 257, and 277 may be coupled to or a part of antennas 218, 258, and 278, respectively. Radios 217, 257, and 277 may receive digital data that is to be sent out to other mBSs, fBSs, RSs and/or endpoints via a wireless connection. Radios 217, 257, and 277 may convert the digital data into a radio signal having the appropriate center frequency and bandwidth parameters for transmission. These parameters may be determined, for example, by a combination of PHY/HW block 212 and MAC/SW block 214 of mBS 210. The radio signal may then be transmitted via antennas 218, 258, and 278 to the appropriate recipient. Similarly, radios 217, 257, and 277 may convert radio signals received via antennas 218, 258, and 278, respectively, into digital data to be processed by PHY/HW blocks 212, 252, or 272 and/or MAC/SW blocks 214, 254, or 274 as appropriate.

In some embodiments, a radio such as radio 257 may include a radio frequency integrated circuit (RFIC) module which may provide channel characteristics for channels available for communication. Such characteristics may include RSSI data. Such data may be stored and processed in either PHY/HW block 252 or MAC/SW block 254 as further described below.

Antennas 218, 258, and 278 may be any type of antenna capable of transmitting and receiving data and/or signals wirelessly. In some embodiments, antennas 218, 258, and 278 may comprise one or more omni-directional, sector or panel antennas operable to transmit/receive radio signals between 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. Together, radio 217 and antenna 218, radio 257 and antenna 258, and radio 277 and antenna 278 may each form a wireless interface.

Communication interfaces 216 and 256 may be used for the wired communication of signaling and/or data between mBS 210 and networks 205, and between fBS 250 and networks 205. For example, communication interface 216 may perform any formatting or translating that may be needed to allow mBS 210 to send and receive data from network 205*c* over a wired connection. As another example, communication interface 256 may comprise an interface (e.g., RJ-45) that is compatible with a corresponding interface on network access device 251, such as an Ethernet interface. While not depicted, endpoint 270 may also include wired interfaces.

As noted above with respect to fBSs 190, fBS 250 may, in essence, be a small base station providing a limited coverage area for a home or office. Depending on the embodiment and configuration of fBS 250 it may be public or private. fBS 250 may rely on the user's network access, via network access device 251, to provide the backhaul connection to network 205*c*, as opposed to the WiMAX service provider supplying the backhaul connection as is the case with mBS 210.

Network access device 251 may be used to provide the owner with Internet access. fBS 250 may utilize the Internet access for its backhaul connection to WiMAX network 205*c*. Depending on the type of network service and/or the user's service provider, network access device 251 may be a cable modem, a digital subscriber line (DSL) modem, a fiber optic modem, or any other modem, gateway or network access device provided by the owner's network service provider. The owner may have any number of routers, switches and/or hubs between fBS 250 and network access device 251.

As part of establishing a backhaul connection, fBS 250 may communicate with network access device 251. Network access device 251, which may be provided or authorized by the user's ISP, may provide fBS 250 with access to the ISP's network 205a which may then allow access to network 205c, via network 205b. Accessing network 205a may involve modem 241 communicating with the ISP's modems 222.

The ISP may operate one or more servers 224 (e.g., OAM&P, AAA, DHCP servers) in providing the user with Internet access. For example, the user may have a digital subscriber line (DSL) account for network access with a DSL provider. Servers 224 may ensure that the user has paid his bills and is otherwise in good standing with the DSL provider.

ISP gateway 226 may connect ISP network 205a with the Internet (e.g., network 205b). This may allow fBS 250 to access WiMAX network 205c via the Internet. In connecting network 205a with the Internet, gateway 226 may perform any necessary formatting and/or security functions.

WiMAX network 205c may have its own gateway 234 and servers 232. Similar to the servers and gateways of ISP network 205a, gateway 234 and servers 232 may ensure that the user has a valid WiMAX account and that network 205c is able to communicate with other networks, such as network 205b. Servers 232 may also contain information, data, instructions and/or logic that may be used to provision various features and functionality of fBS 250. For example, they may provide fBS 250 with channel information for its wireless connection 290b with endpoint 270.

Endpoint 270 may be any type of wireless endpoint able to send and receive data and/or signals to and from mBS 210 and/or fBS 250. Some possible types of endpoints 270 may include desktop computers, PDAs, cell phones, smart phones, laptops, and/or VoIP phones.

Thus far several different embodiments and features have been presented. Particular embodiments may combine one or more of these features depending on operational needs and/or component limitations. This may allow for great adaptability of network 200 to the needs of various organizations and users. For example, a particular embodiment may use several mBSs to provide wireless access for a metropolitan area, or a single mBS may be used with several RSs to provide the necessary coverage. Furthermore, in some embodiments, fBS 250 may have more or less radios. Some embodiments may include additional features.

The following examples may help to illustrate how these components inter-work with one another to provide the functionality of particular embodiments. In one situation, fBS 250 may be coupled to network 205c through network access device 251. However, fBS 250 may need to configure certain communication parameters in order to communicate with endpoint 270. Such parameters may include a center frequency, which may be determined by selecting an appropriate channel for communication. In some embodiments, fBS 250 may include a list of available channels stored within memory elements, such as those available in either PHY/HW block 252 or MAC/SW block 254. Elements within network 205c such as servers 232 may send information to fBS 250 which informs fBS 250 of the available channels for communication. From this information or from information stored within memory elements of fBS 250, fBS 250 may determine a set of channels available for communication.

fBS 250 may be configured to analyze the set of available communication channels and determine a channel on which to communicate, as described further below with respect to FIG. 3. fBS 250 may utilize radio 277 to determine characteristics of the channels within the set of available communication channels. For example, an RFIC may be utilized to determine RSSI information about each channel. The RFIC may output the RSSI information in an analog format and the information may then be converted into a digital format and be stored in memory elements either within PHY/HW block 252 or MAC/SW block 254. Radio 277 may be configured to analyze the available set of communication channels during particular times of data transmission such as during a preamble phase or an receive/transmit transition gap (RTG) phase. The stored channel characteristics may then be analyzed by PHY/HW block 252 and, based upon this analysis, a channel may be selected for communication. In other examples, channel quality characteristics may be determined by PHY/HW block 252 and or MAC/SW offer block 254 by utilizing radio 257 as opposed to radio 257 directly outputting the channel characteristics.

In some embodiments, fBS 250 may need to configure various parameters such as a center frequency (which may be determined by selecting an appropriate channel for communication), a segment index, and a preamble index. In some embodiments, fBS 250 may include a list of available channels and preamble indices stored within memory elements, such as those available in either PHY/HW block 252 or MAC/SW block 254. Elements within network 205c such as servers 232 may send information to fBS 250 which informs fBS 250 of the available channels and/or preamble indices for communication. From this information or from information stored within memory elements of fBS 250, fBS 250 may determine a set of channels and/or preamble indices available for communication.

fBS 250 may be configured to analyze the set of available communication channels and determine a channel on which to communicate, as described further below with respect to FIG. 4. fBS 250 may utilize PHY/HW block 252 or MAC/SW block 254 to analyze the segments present in a channel determining the power of transmissions present on each segment. Further, fBS 250 may analyze preambles used on a channel. As described further below, this may be done for several purposes. One reason for analyzing the used preambles is so that fBS 250 may determine which preamble it should use for communication. Another reason for analyzing the preambles present on the channel is enabling fBS 250 to determine which base stations (either mBSs such as mBS 210 or other fBSs) are in the vicinity of fBS 250. Determining the base stations in fBS's 250 vicinity may help fBS 250 perform a handover operation with the most suitable base station. As described further below, fBS 250 may transmit the base station information to one or more nodes within network 205c (such as servers 232) and the nodes may respond to fBS 250 with one or more base station identifiers to use for handover operations. In various embodiments, the base station information transmitted by fBS 250 may be used by entities in network 205c to monitor the status of the communication network; this may allow operators of network 205c to ensure the quality of service at the communication network.

Thus far several different embodiments and features have been presented. Particular embodiments may combine one or more of these features depending on operational needs and/or component limitations. This may allow for great adaptability of network 200 to the needs of various organizations and users.

Figure 3:
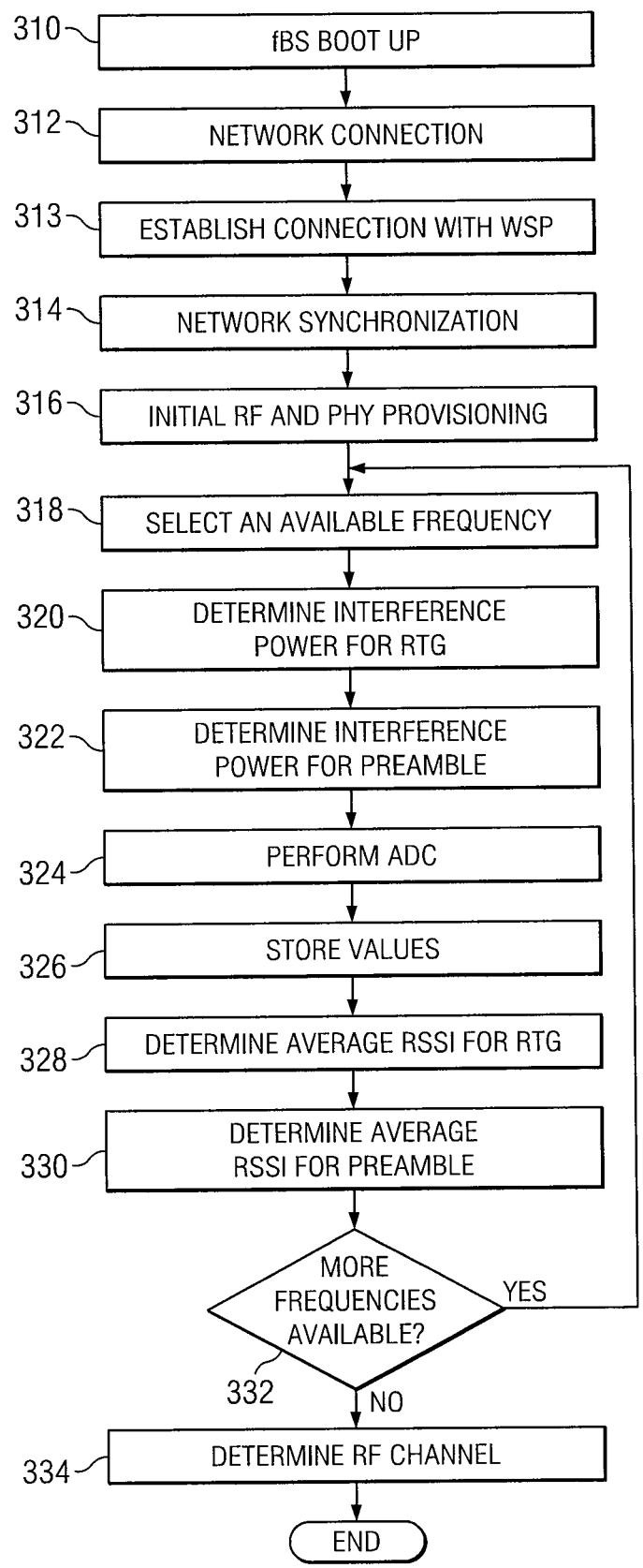
FIG. 3 is a flowchart illustrating one embodiment of the operation of a femto base station.

FIG. 3 is a flowchart illustrating one embodiment of the operation of a femto base station (fBS), such as fBS 250. In general, the steps illustrated in FIG. 3 may be combined, modified, or deleted where appropriate, and additional steps may also be added to the example operation. Furthermore, the described steps may be performed in any suitable order.

Step 310 may begin once the fBS receives power and/or has otherwise been turned-on. During boot-up the fBS may execute a predetermined set of procedures that may load any software applications desired for operation. The applications that are loaded, and the order in which they are loaded, may vary depending on the particular implementation. The applications may be stored in a memory module, such as memory 254. Loading the applications may be accomplished by utilizing a processor, such as processor 252. Regardless of the order or specifics of the procedures implemented by the fBS during boot-up at step 310, once step 310 is complete the fBS may be functional such that any software applications that may be needed may be executed.

At step 312, the fBS attempts to connect to a public access network, such as ISN network 110f described above with respect to FIG. 1. This connection provides the fBS with its backhaul connection to the appropriate WSP's network. As discussed above, the backhaul connection may use the owner's own general use Internet access (e.g., the Internet access that the owner may use with his laptop to access the Internet) provided by an ISP. Depending on the embodiment, the public access network connection may be provided through xDSL, cable, or any other suitable and/or available network access means. In some embodiments, the fBS is connected to a leased or private access communication network.

Regardless of the type of network access that is used, the fBS or the network access device to which the fBS is connected may typically need to establish a connection (including, e.g., receiving an IP address) with the ISP's network in order to proceed.

At step 313, the fBS may attempt to connect to the WSP's network. In particular embodiments, the fBS may be sold by a particular WSP that may pre-provision the fBS with various information. For example, the WSP may pre-provision the fBS with RF spectrum channels related to the WSP, an IP address of a security gateway for the WSP, an IP address of a related AAA server for the WSP, and any needed security parameters required to access the WSP's network. The fBS may use all, some or none of this information in attempting to connect to the WSP's network. As previously mentioned, the WSP may be the same or a different provider than the ISP. For example, a user may have WiMAX service from a first provider and Internet access from a second provider. As another example, a user may have WiMAX service and Internet access from the same provider.

At step 313, both the fBS's owner and the fBS itself may also be authenticated. The authentication may, for example, be done to verify that the owner's account is in good standing and that fBS is an authorized fBS. If the fBS is attempting to authenticate with a foreign WSP's network, the foreign WSP may also verify that the Service Level Agreement (SLA) credentials of the owner's WSP are still in good standing.

In particular embodiments, during authentication the owner's WSP or the foreign WSP, as the case may be, may send the fBS certain RF and PHY parameters. These parameters may be used by the fBS to start its initial operations. The RF channel parameters may help the fBS to narrow the range of its RF scan to only the allocated RF spectrum (e.g., 30 MHz) rather than the entire frequency band (e.g., 200 MHz). Reducing the RF spectrum to be scanned may speed up the RF scanning process. In certain embodiments, the fBS may also receive initial RF power parameters. This may effect the range of the fBS and thus its impact on any neighboring access stations. Depending on the embodiment, the PHY parameters may include one or more of the Fast Fourier Transform (FFT) size, the downlink/uplink subframe ratio, segmentation, or the pseudo noise (PN) sequence.

At step 314, the fBS begins network synchronization with the WSP's (either the owner's WSP or the foreign WSP) wireless network. This may include the fBS becoming synchronized in time with the WSP's master WiMAX network. Network synchronization may be achieved using any of a variety of techniques. For example, if the fBS is equipped with a GPS device, and the GPS device is able to receive a satellite signal, then the timing signal within the GPS signal may be used for synchronization. As another example, the fBS may synchronize over the public access network it is using for its backhaul connection using, for example, IEEE 1588.

At step 316 the initial RF and PHY provisioning is performed. The provisioning may be based on the RF and PHY parameters that the fBS may have previously received during authentication. The provisioning may be done while considering the spectrum coverage provided at the respective location. For example, if the fBS is in a foreign location (e.g., a location covered by a foreign WSP) then the basic RF and PHY parameters may be provided by the foreign WSP. In some embodiments, the fBS may receive a list of available channels, or centre frequencies, that may be used for communicating at the location of the fBS.

At step 318, the fBS may begin analyzing the available RF channels by selecting one of the available RF channels for scanning. In some embodiments, the available channels may lie within 3496 to 2670 MHz range and may be 50 Mhz wide. The available RF channels may be received by the fBS during network synchronization (such as at step 314) or during a provisioning phase (such as at step 316).

At steps 320 through 326, channel metrics (for example, the RSSI of the channel) may be determined for the selected channel and stored for processing. In some embodiments, this may occur utilizing an RFIC which may be present in the radio of the fBS. The RFIC may be configured to output metrics such as RSSI of each channel of the available channels. The RFIC may be configured to ascertain the metrics during a particular phase of communication. Carefully selecting such time periods may lead to a more accurate measurement of the channel quality metrics. The RFIC may be configured to measure the metrics during a receive/transmit transition gap (RTG) phase (step 320) and/or during a pre-amble phase (step 322) of communication. Such phases may be determined in accordance with communication protocols (such as the WiMAX protocol) used by the wireless network. Channel quality metrics of the scanned channels may include signal strength, noise strength, link quality, and any other suitable indications of the ability of the channel to communicate information.

If the RFIC outputs analog signals, an analog-to-digital conversion (ADC) process may be performed on the output of the RFIC (step 324). These metrics may be stored in memory elements within a PHY/HW block or MAC/SW block after being passed through an ADC (step 326). In various embodiments, the RFIC may output digital signals representing the channel characteristics which may be stored in memory elements either in the PHY/HW block or the MAC/SW block (hence, not requiring step 324 to be performed).

In various embodiments, the radio of the fBS may receive the signals without determining channel quality metrics; instead, the signals received by the radio may be stored digitally and be processed by, for example, the PHY/HW block of the fBS. Thus, for example, steps 324 and 326 may be performed before steps 320 and 322. As described above, the radio may be configured to scan the available channels during particular phases of communication, such as a preamble phase or an RTG phase. The stored signals may comprise samples taken over a time period. The PHY/HW block, at times in conjunction with the MAC/SW block, may perform analysis either in the time domain or frequency domain of the stored signals. To perform analysis in the frequency domain, PHY/HW block may perform a Fourier transform, such as the Fast Fourier Transform (FFT), on the stored signals from the radio. Channel quality metrics, such as RSSI, may be determined as a result of this analysis.

At steps 328 and 330, the fBS may analyze the channel metrics determined at steps 320 and 322, respectively, by computing averages of the sampled channel metrics. For example, the embodiment illustrated in FIG. 3 depicts that average RSSI values for an RTG phase and a preamble phase of the channel are determined at steps 328 and 330, respectively. In some embodiments, this may be accomplished utilizing the following equations:

$$PWR_{RTG} = \sum_{sa=1}^{SA_{RTG}} RSSI(sa)/SA_{RTG} \qquad \text{Equation 1}$$

$$PWR_{Preamble} = \sum_{sa=1+SA_{RTG}}^{SA_{RTG}+SA_{Preamble}} RSSI(sa)/SA_{Preamble} \qquad \text{Equation 2}$$

where $PWR_{RTG}$ and $PWR_{Preamble}$ are the interference power measured, respectively, and $SA_{RTG}$ and $SA_{Preamble}$ are the number of RSSI samples obtained during RTG phase and preamble phase, respectively. Either or both of these metrics may be used in determining the channel on which to communicate. The $PWR_{Preamble}$ metric may indicate the amount of noise or interference on the analyzed channel due to other devices operating on the wireless network. The $PWR_{RTG}$ metric may indicate the amount of noise on the channel stemming from sources other than devices operating on the wireless network. Such sources may include natural phenomena as well as other devices generating signals on the channel. These figures may be computed using elements such as those found in PHY/HW block 252 and/or MAC/SW block 254.

At step 332, a determination is made as to whether there are channels in the list of available channels that have not been scanned. If there are, steps 318-330 may be performed on the unanalyzed channels successively until the available channels are scanned (or until a particular threshold is met, as discussed below). If there are not, step 334 may be performed. At step 334, a channel is selected for communication with an endpoint such that the endpoint may be provided access to a network (such as network 205c) as result of the backhaul connection of the fBS. In some embodiments, this may be done using one or both of the averages computed at steps 328 and 330. For example, the fBS may choose to communicate on the channel with the lowest average RSSI power during the RTG phase or preamble phase. The fBS may also utilize both averages in making its determination. The fBS may compute a weighted sum of the averages computed at steps 328 and 330 and select the channel with the smallest weighted sum of the averages. The weights assigned to each of the averages may be determined by the fBS or may be transmitted to the fBS by the WSP. Factors that affect the value of these weights may include the location of the fBS, the number of endpoints in proximity to the fBS, the number of mBSs in proximity to the fBS, and the number of other fBSs in proximity to the fBS.

In some embodiments, the fBS may use thresholds to determine a channel(s) on which to communicate. For example, the fBS may select a channel to communicate on if it has an average RSSI power during the RTG and/or preamble phase at or lower than a predetermined limit. Such limits may also be used with a weighted sum of the RSSI power averages discussed above. As a result, the fBS may select a channel to communicate on before all of the available channels are analyzed. Hence, step 332 may be skipped once a threshold is met. Using thresholds may allow the fBS to select a channel faster.

Figure 4:
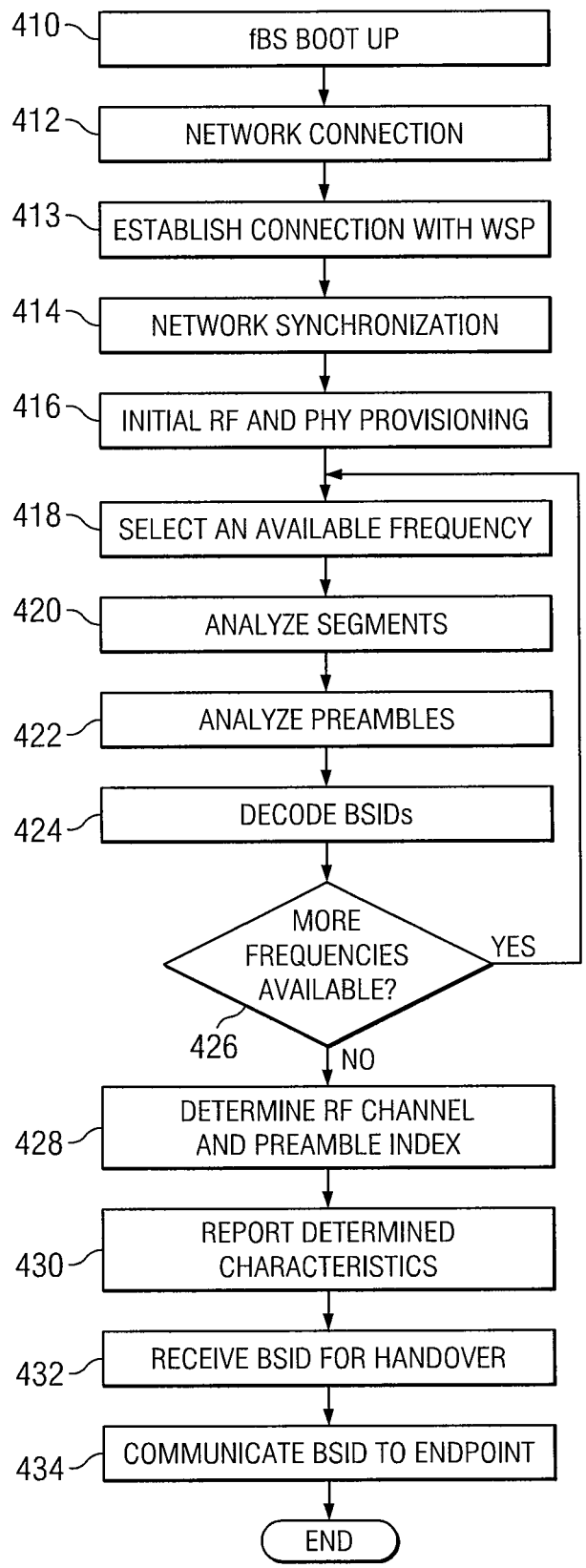
FIG. 4 is a flowchart illustrating another embodiment of the operation of a femto base station.

FIG. 4 is a flowchart illustrating one embodiment of the operation of a femto base station (fBS), such as fBS 250. In general, the steps illustrated in FIG. 4 may be combined, modified, or deleted where appropriate, and additional steps may also be added to the example operation. Furthermore, the described steps may be performed in any suitable order.

Steps 410-416 may be similar to steps 310-316. Variations in the performance of steps 410-416 as compared to what is performed in steps 310-316 may be suitable due to the performance of steps 418-434. Some examples of these variations are discussed below.

At step 418, the fBS may begin analyzing the available RF channels by selecting one of the available RF channels for scanning. In some embodiments, the available channels may lie within 3496 to 2670 MHz range and may be 50 Mhz wide. The available RF channels may be received by the fBS during network synchronization (such as at step 414) or during a provisioning phase (such as at step 416).

At step 420 the fBS may analyze a channel metric associated with the segments of the channel selected at step 418. As discussed above, a channel may include one or more segments. The segments may include one or more subchannels that the fBS may use for communication. An example quality metric that may be determined by the fBS is a power metric associated with each segment of the channel. The power metric may be determined by summing the power of the signals present on each subchannel of the segment. Other quality metrics of each segment of the selected channel may be determined by the fBS as well. For example, noise levels associated with each segment may be determined. The metrics determined by the fBS may represent the amount of communication from other nodes present on each of the segments of the channel.

At step 422, the fBS may analyze preambles transmitted on the channel selected at step 418. In some embodiments this may occur before, during, or after step 420. The fBS may use correlators in order to detect preambles used on the channel. As discussed above, the preamble symbols may be used by base stations to initiate a communication frame with endpoints. The correlators may operate by analyzing received signals on the channel and determining to what degree those signals match with a predetermined set of preamble signals. The fBS may operate multiple correlators at the same time such that the received signals are analyzed for more than one preamble at the same time. The predetermined set of preambles may be stored in a memory element within the fBS. The predetermined set may be received by the fBS during such steps as steps 414 and 416. The correlators may output a signal such as a voltage level which corresponds to the degree that the received preamble symbol matches a stored preamble symbol. The fBS may store these metrics for further processing. In some embodiments, the fBS may only store the metrics that correspond to the stronger preambles as determined by the correlators.

At step 424 the fBS may decode base station IDs (BSID) that are transmitted on the selected channel. In some embodiments this may occur before, during or after step 420. As discussed above, base station IDs that are decoded from communications occurring on the channel may indicate which base stations (such as macro base stations) are being utilized for communication on the network. The BSIDs may be decoded by analyzing the preambles detected at step 422. In some embodiments, the fBS may determine information from the preambles that allow the fBS to analyze downlink map portions (DL-MAP) of a communication frame transmitted by various base stations. The fBS may be able to determine the BSIDs by analyzing the DL-MAPs. The decoded BSIDs may be stored in memory elements within the fBS.

At step 426 the fBS determines if there are available channels that have not been analyzed. If there are channels that have not been analyzed, the fBS proceeds to analyze the next unanalyzed channel and returns to step 418 and continues through steps 420, 422, 424 arriving at step 426 again. If the fBS determines that all of the available channels have been analyzed, the fBS proceeds to step 428.

At step 428 the fBS may determine an RF channel and a preamble index to use for communication. In some embodiments, the fBS may store the results of the analysis of the segments of the available channels as completed in step 420. The fBS may select the channel that has the segment with the lowest amount of power due to transmissions occurring on the segment. The fBS may determine a preamble index by analyzing the results of the analysis of the preambles for the selected RF channel (for example, the results of step 422 for the selected channel). The fBS may choose a preamble index that had the lowest output determined by the correlators. This may represent a preamble that is not being used by other base stations.

In some embodiments, the fBS may use thresholds to determine the RF channel and preamble index to use for communication. The use of thresholds may mean that step 426 may be skipped or may only be utilized for a certain number of available channels. For example, the fBS may establish a threshold to be utilized at step 420. When determining channel quality metrics at step 420, the fBS may compare the metrics determined for each segment of the channel and may determine that the metric is below a predetermined threshold. Based on this, the fBS may determine to select the channel which comprises that segment even though at least one other available channel has not been analyzed. Thus, at step 426, even though other channels are available that have not been analyzed, the fBS proceeds to step 428 instead of returning to step 418. Once the fBS determines the channel based on the analysis at step 420, it may proceed to analyze the available preambles in that channel. In some embodiments a threshold may be established for the analysis of the preambles as well. The voltage output of the correlators, for example, may be compared to a predetermined threshold for the preambles and if a preamble at the out put of the correlator for a particular preamble is below the threshold, the fBS may determine to utilize that preamble for communication. However, in some situations it may be found that all of the preambles in the selected channel are above a predetermined threshold. In that case, the fBS may proceed to the next unanalyzed available channel and return to step 422. In various embodiments, the fBS, while analyzing the preambles at step 422, may still decode BSIDs in corresponding DL-MAPs as in step 424. Thus, step 428 may be performed before, during or after steps 420, 422, and 424.

At step 430, the fBS may report the data determined at steps 420-424. This may occur before, during, or after each of steps 420, 422, 424 and 428. For example, the fBS may report the channel quality metrics associated with each segment of the channel determined at step 420. The fBS may report these to an entity within the wireless service provider's network and that entity may use the information to gain a better understanding of network loads on each of the nodes of the network. For example, the wireless service provider may use this information to alleviate bottlenecks of overloaded nodes in the network.

At step 432, the fBS may receive a BSID to be used for handover. An entity within the wireless service provider's network may utilize the BSIDs decoded at step 424 (reported by the fBS at step 430) to determine which base station an endpoint may be handed over to after leaving an area covered by the fBS. The fBS may receive this information through the connection provided by the network access device. The characteristics reported at step 430 may be utilized in the determination of which BSID to use for handover. For example, understanding the various loads already present on nodes of the network may help determine to which base station an endpoint should be transferred. The determination of which base station to use for handover may utilize location information of the fBS. In some embodiments, the location of the fBS may be determined by an entity on the wireless service provider's network based on the reported BSIDs and preamble strengths that were transmitted by the fBS at step 330. For example, the network may already know the location of the reported BSIDs and may use methods such as triangulation in combination with the preamble strengths to determine location information for the fBS.

At step 434, the fBS may send the BSID received at step 432 to an endpoint in order to facilitate handover. In some embodiments this may occur during the need for handover, or may occur before the need for handover arises. The endpoint may store the BSID and may use it to support handover. In some embodiments, determining the BSID to use for handover may allow the endpoint to accomplish handover without terminating a communication session with the wireless service provider. Thus, for example, if the endpoint is currently in a data session, such as a telephone call, the endpoint may be able to transition from utilizing the fBS to utilizing another base station without having to terminate the call.

Although several embodiments have been illustrated and described in detail, it will be recognized that modifications and substitutions are possible without departing from the spirit and scope of the appended claims.

What is claimed is:

1. A method for wireless communication comprising:
   coupling a base station to a network access device, the network access device providing the base station access to a wireless service provider network via an Internet service provider network;
   receiving, at the base station from the network access device, a list of available communication channels of the wireless service provider network that may be utilized to communicate with an endpoint;
   determining, at the base station, at least one interference power measurement for at least one channel of the plurality of channels;
   determining, at the base station, at least one average interference power for at least one channel of the plurality of channels utilizing the at least one interference power measurement;
   automatically selecting a channel for communication with the endpoint in response to determining the at least one average interference power, wherein automatically selecting the channel comprises determining a weighted sum of an average interference power present during a preamble phase of a communication frame of the wireless service provider network and an average interference power present during a receive/transmit transition gap phase of a communication frame of the wireless service provider network;

providing the endpoint access to the wireless service provider network utilizing the Internet service provider network via the selected channel.

2. The method of claim 1, wherein the at least one interference power measurement is determined by a radio frequency integrated circuit.

3. The method of claim 1, wherein the at least one interference power measurement comprises a measurement taken during a preamble phase of a communication frame of the wireless service provider network.

4. The method of claim 1, wherein the at least one interference power measurement comprises a measurement taken during a receive/transmit transition gap phase of a communication frame of the wireless service provider network.

5. The method of claim 1, wherein the plurality of available communication channels comprise WiMAX communication channels.

6. The method of claim 1, wherein automatically selecting the channel comprises comparing the at least one average interference power to a threshold.

7. A system for wireless communication comprising:
an interface coupled to a network access device, the network access device providing access to an Internet service provider network;
a processor operable to:
  determine a plurality of available communication channels of a wireless service provider network that may be utilized to communicate with an endpoint based on a list of available communication channels received from the network access device;
  determine at least one interference power measurement for at least one channel of the plurality of channels;
  determine, at the base station, at least one average interference power for at least one channel of the plurality of channels utilizing the at least one interference power measurement; and
  automatically select a channel for communication with the endpoint in response to determining the at least one average interference power, wherein automatically selecting the channel comprises determining a weighted sum of an average interference power present during a preamble phase of a communication frame of the wireless service provider network and an average interference power present during a receive/transmit transition gap phase of a communication frame of the wireless service provider network; and
a radio operable to communicate with an endpoint utilizing the selected channel such that the endpoint is provided access to the wireless service provider network utilizing the Internet service provider network.

8. The system of claim 7, wherein determining the at least one interference power measurement comprises receiving the at least one interference power measurement from a radio frequency integrated circuit.

9. The system of claim 7, wherein the at least one interference power measurement comprises a measurement taken during a preamble phase of a communication frame of the wireless service provider network.

10. The system of claim 7, the at least one interference power measurement comprises a measurement taken during a receive/transmit transition gap phase of a communication frame of the wireless service provider network.

11. The system of claim 7, wherein the plurality of available communication channels comprise WiMAX communication channels.

12. The system of claim 7, wherein automatically selecting the channel comprises comparing the at least one average interference power to a threshold.

13. A tangible, non-transitory computer-readable medium comprising instructions that, when executed by a processor, cause the processor to:
couple a base station to a network access device, the network access device providing access to an Internet service provider network;
receive, at the base station from the network access device, a list of available communication channels of the wireless service provider network that may be utilized to communicate with an endpoint;
determine, at the base station, at least one interference power measurement for at least one channel of the plurality of channels;
determine, at the base station, at least one average interference power for at least one channel of the plurality of channels utilizing the at least one interference power measurement;
automatically select a channel for communication with the endpoint in response to determining the at least one average interference power, wherein automatically selecting the channel comprises determining a weighted sum of an average interference power present during a preamble phase of a communication frame of the wireless service provider network and an average interference power present during a receive/transmit transition gap phase of a communication frame of the wireless service provider network;
provide the endpoint access to the wireless service provider network utilizing the Internet service provider network via the selected channel.

14. The medium of claim 13, wherein determining the at least one interference power measurement comprises receiving the at least one interference power measurement from a radio frequency integrated circuit.

15. The medium of claim 13, wherein the at least one interference power measurement comprises a measurement taken during a preamble phase of a communication frame of the wireless service provider network.

16. The medium of claim 13, wherein the at least one interference power measurement comprises a measurement taken during a receive/transmit transition gap phase of a communication frame of the wireless service provider network.

17. The medium of claim 13, wherein the plurality of available communication channels comprise WiMAX communication channels.

18. The medium of claim 13, wherein automatically selecting the channel comprises comparing the at least one average interference power to a threshold.

* * * * *